Patented Apr. 22, 1947

2,419,405

UNITED STATES PATENT OFFICE 2,419,405

PROCESS FOR PREPARING 1-HYDROXY-4-ARYLAMINO ANTHRAQUINONES

David X. Klein, Wilmington, Del., assignor to E. I. du Pont de Nemours & Company, Wilmington, Del., a corporation of Delaware No Drawing. Application May 5, 1943, Serial No. 485,949

1 Claim. (Cl. 260—380)

This invention relates to an improvement in the process for preparing 1-hydroxy-4-arylaminoanthraquinones. The present application is a continuation-in-part of my co-pending applications Serial Nos. 412,288 and 412,289, filed September 25, 1941, which have eventuated into U. S. Patents 2,333,384 and 2,335,680.

It is the object of the invention to provide a simple and economical process for preparing 1-hydroxy-4-arylamino-anthraquinones from quinizarin and leuco quinizarin in relatively pure form, which process is of value not only in the preparation of the known 1-hydroxy-4-arylaminoanthraquinones, but is particularly adapted for the preparation of new compounds of this series, which, because of the nature of the arylamines that must be employed in the reaction, cannot be satisfactorily produced on a commercial scale by the processes of the prior art.

While it has been known that the condensation of leuco quinizarin with phenylamines in the presence of boric acid using an excess of phenylamine produces di-condensation products, and that a similar condensation carried out in the absence of boric acid but in the presence of a weaker condensing agent (such as acetic or mineral acid) gives mono-condensation products, I have found that the condensation of leuco quinizarin with phenylamines when the latter are used only in slight excess of that theoretically required and the reaction is carried out in the presence of boric acid and a solvent such as an alcohol or water or a mixture of the same in the presence of boric acid the mono-condensation product is obtained in relatively high yields and purity. The amount of excess of the phenylamine required depends upon the reactivity of the particular phenylamine and may vary from 10% to approximately 100% in excess of theory. The ratio of the phenylamine to the solvent employed should be preferably 1.1 mole to approximately 4.18 parts of solvent. The use of from 4 to 5 parts of solvent, i. e. alcohol and/or water per part of quinizarin and leuco quinizarin combined has been found to give very satisfactory results where the amount of amine employed does not exceed that which has been found to give complete monoarylamination of the quinizarin. The reaction will usually come to completion within 12 hours after reaching reaction temperature, although with very reactive amines a shorter time is required.

Methyl and ethyl alcohols are preferred as diluents in the reaction although water with alcohol or a mixture of alcohols operates satisfactorily. The solvents should have a low solvent power for the products of the reaction, and they should be miscible with water. The ratio of leuco quinizarin to quinizarin should be preferably in the ratio of 1 to 4. When the ratio of solvent to the leuco quinizarin and quinizarin combined exceeds approximately 4.18 to 1, a corresponding increase in the amount of amine employed is generally desirable.

The following examples are given to illustrate the invention. The parts used are by weight.

Example 1

9.6 parts of quinizarin (100%), 2.6 parts of leuco quinizarin (100%), 6 parts of boric acid, 6.5 parts of p-aminophenol and 50 parts of 95% ethyl alcohol are heated to 78° C. for 12 hours. The reaction product, after diluting with alcohol, is filtered off, washed with alcohol and finally with water. The crude cake is then boiled up with 400 parts of a 7% sodium hydroxide solution, filtered and washed alkali free with hot water. On drying, 1-hydroxy-4-(4'-hydroxyanilino)-anthraquinone, having a melting point of 254° C. and a N-content of 4.08%, is obtained in a high yield. It dyes cellulose acetate in reddish-blue shades of good strength and of excellent fastness to gas fumes.

Example 2

8.25 parts of quinizarin, 2.3 parts of leuco quinizarin and 6 parts of boric acid are added to a solution formed by mixing 10 parts of p-(beta-hydroxyethoxy)-aniline-hydrochloride and 2 parts of sodium hydroxide in 40 parts of 95% ethyl alcohol. After heating at 78° C. for 12 hours, the mass is cooled, filtered and worked up as in Example 1. The 1-hydroxy-4-(p-beta-hydroxy-ethoxy-anilino)-anthraquinone is obtained in high yields having a melting point of 167° C. and a nitrogen content of 3.86%. It dyes cellulose acetate in reddish-blue shades of excellent fastness to gas fumes.

Example 3

9.4 parts of quinizarin, 2.6 parts of leuco quinizarin, 11.7 parts of 4'-aminophenoxy acetic acid ethyl ester, 6 parts of boric acid, and 50 parts of 95% denatured ethyl alcohol are refluxed together for 12 hours. The precipitated product is filtered, and washed with water. The cake is then treated with 400 parts of a 7% sodium hydroxide solution at the boil, filtered, and the filtrate acidified.

The product of the following formula is obtained, which dyes cellulose acetate in violet shades:

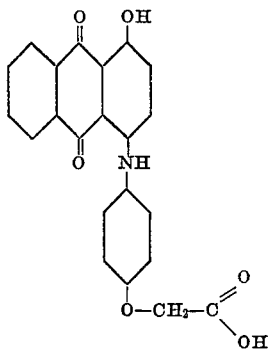

Example 4

When the reaction as described in Example 3 is carried out, and the product is treated with 400 parts of a 2½% sodium carbonate solution at room temperature in place of the sodium hydroxide solution at the boil, and the suspension is filtered from a small amount of hydrolyzed product and washed further with dilute sodium carbonate solution and finally with water, a product of the formula is obtained which has a melting point of 133.9° C. and a nitrogen content of 3.39%.

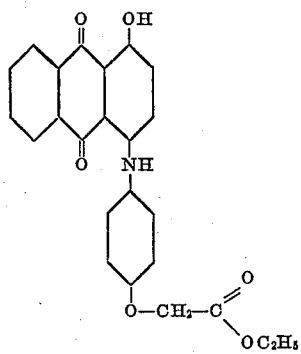

It dyes cellulose acetate in violet shades.

Example 5

9.4 parts of quinizarin, 2.5 parts of leuco quinizarin, 8.1 parts of pseudo cumidine (2,4,5-trimethyl-aniline), 6 parts of boric acid and 50 parts of benzene denatured 95% ethyl alcohol are refluxed under agitation for 12 hours. After cooling, the product is filtered, washed first with alcohol, then water, and boiled up with 400 parts of 0.7% sodium hydroxide solution. The resulting mass is filtered warm, washed with 400 parts of 0.7% sodium hydroxide solution, then washed alkali-free with warm water and dried. A yield of approximately 15 parts of 1-hydroxy-4-(2,4,5-trimethylanilino)-anthraquinone is obtained, having a melting point of 193.5° C., and a nitrogen content of 3.90%.

Example 6

Substituting 17.5 parts of 2-amino-p-cymene (2-methyl-5-isopropyl-aniline) for pseudo cumidine in Example 5, the 1-hydroxy-4-(2'-methyl-5'-isopropyl-anilino)-anthraquinone is obtained in good yields and purity.

Example 7

Substituting 14.95 parts of aniline for the pseudo cumidine in Example 5, a yield of about 13 parts of 1-hydroxy-4-anilino-anthraquinone is obtained having a melting point of 153° C. and a nitrogen content of 4.36%.

Example 8

18 parts of quinizarin, 6 parts of leuco quinizarin, 21.9 parts of p-toluidine, 15.84 parts of boric acid and 50 parts of benzene denatured 95% ethyl alcohol are heated at 60° C. for 45 minutes. The crystalline precipitate is filtered, washed with alcohol and finally with water. The cake is then treated with 0.7% of sodium hydroxide solution as in Example 5, then washed alkali-free and dried. A yield of approximately 26 parts of 1-hydroxy-4-p-toluidino-anthraquinone is obtained, having a melting point of 186.1° C. and a nitrogen content of 4.34%.

Example 9

9.6 parts of quinizarin (100%), 2.4 parts of leuco quinizarin (100%), 6 parts of boric acid, 10.3 parts of 3-amino-benzyl acetamide and 50 parts of 95% ethyl alcohol are heated to 78° C. for 12 hours. The reaction product after diluting with alcohol is filtered off, washed with alcohol, and finally with water. The crude cake is then boiled up with 400 parts of a 7% sodium hydroxide solution, filtered and washed alkali free with hot water. The 1-hydroxy-4-(3'-(omega-acetylamino-methyl)-anilino)-anthraquinone of the formula:

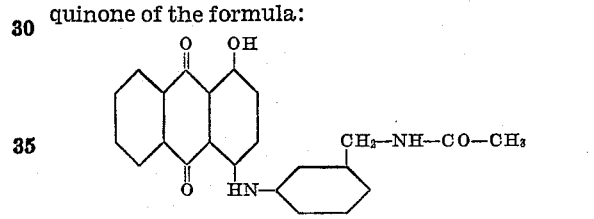

is obtained which dyes cellulose acetate in bluish-violet shades of excellent fastness to gas fumes. It has a melting point of 222° C. and a nitrogen content of 7.38%.

Example 10

9 parts of quinizarin, 3 parts of leuco quinizarin, 8.8 parts of 2 methyl-5-amino benzyl cyanide, 6 parts of boric acid, and 50 parts of ethyl alcohol (95%) are heated at 78° C. for 12 hours. After cooling the product, 1-hydroxy-4(4'-methyl-3'-cyano-methyl anilino) anthraquinone, is finely ground and extracted at the boil with 400 parts of 0.7% of sodium hydroxide solution. After filtering and washing with 400 parts of 0.7% sodium hydroxide solution, the precipitate is washed alkali-free and dried. The product has a melting point of 173° C. and a nitrogen content of 7.54%. It dyes cellulose acetate in violet shades of excellent fastness to gas fumes.

Example 11

9 parts of quinizarin, 3 parts of leuco quinizarin, 8 parts of meta amino benzyl cyanide, 6 parts of boric acid, and 50 parts of ethyl alcohol are heated at 78° C. for 12 hours. After working up as in Example 2, the 1-hydroxy-4(m-cyanomethyl anilino) anthraquinone, is obtained which has a melting point of 175° C. and a nitrogen content of 7.34%. It dyes cellulose acetate in violet shades somewhat redder than the product of Example 10.

Example 12

9.4 parts of quinizarin, 2.6 parts of leuco quinizarin, 11.3 parts of 2-methyl-5(methoxy-methyl) aniline, 6 parts of boric acid, and 50 parts of 50% alcohol are heated at 85°–88° C. for 12 hours. After cooling, the product, 1-hydroxy-4(2'-methyl-5'-methoxy-methyl anilino) anthraquinone, is filtered and treated (as described in Example 9) with dilute caustic solution, filtered, washed and dried. The product dyes cellulose acetate in reddish-violet shades. It has a melting point of 135.3° C. and a nitrogen content of 3.64%.

*Example 13*

By substituting 10.1 parts of p-amino benzyl cyanide hydrochloride for the amines in Example 10, and 7.9 parts of sodium metaborate for the boric acid, and carrying out the reaction in the same manner, the 1-hydroxy-4(p-cyano-methyl anilino) anthraquinone is obtained which dyes cellulose acetate in violet shades. It has a melting point of 184° C. and a nitrogen content of 7.64%.

It is of course understood that other arylamines may be substituted for those specifically mentioned in the above examples, for it has been found that any of the arylamines which normally react with quinizarin and leuco quinizarin can be employed in the preparation of the mono-condensation products in high yields by the process as above described, and with substantially no formation of the di-condensation product.

In the prior art processes, large excesses of the aromatic amine that is to be condensed with the quinizarin and leuco quinizarin are generally employed, even in the preparation of the mono-condensation product. With the readily available and cheap amines, such as aniline and toluidine, which, under normal conditions, are liquids, it is possible to recover the excess that has been employed in the process, although this involves troublesome and time-consuming operation. The present process permits the use of very small excesses of the amine over that theoretically required to effect the mono-condensation, and permits the condensation to be carried out with amines that could not be satisfactorily employed in the large excesses required by the prior art processes.

I claim:

The process of preparing 1-hydroxy-4-arylaminoanthraquinones which comprises reacting a mixture of quinizarin and leuco quinizarin, in which the leuco quinizarin comprises from 20% to 25% of the mixture, with an arylamine in the presence of boric acid and a solvent of the class consisting of alcohols and water, the amount of arylamine employed being that amount, less than two mols per mol of quinizarin and leuco quinizarin combined, which is required to convert all of the dihydroxy compounds to the 1-hydroxy-4-arylaminoanthraquinone without the formation of any substantial amount of the 1,4-diarylaminoanthraquinone, the amount of solvent employed being in a ratio of from 4 to 5 parts per part of quinizarin and leuco quinizarin in the reaction.

DAVID X. KLEIN.

REFERENCES CITED

The following references are of record in the file of this patent:

FOREIGN PATENTS

| Number | Country | Date |
|---|---|---|
| 22,128 | British | 1901 |
| 86,150 | German | Mar. 13, 1896 |
| 91,149 | German | Feb. 18, 1897 |
| 91,150 | German | Feb. 22, 1897 |
| 93,223 | German | June 25, 1897 |
| 98,911 | German | June 8, 1898 |

OTHER REFERENCES

Grandmougin Jour. F. Prak. Chem. (2), vol. 76, p. 140 (1909).

Grandmougin Jour. F. Prak. Chem. 76 (2), p. 141 (1907).